US009596166B2

United States Patent
Iyer et al.

(10) Patent No.: US 9,596,166 B2
(45) Date of Patent: Mar. 14, 2017

(54) METHODS, SYSTEMS, AND COMPUTER READABLE MEDIA FOR TESTING INTER-CELL INTERFERENCE COORDINATION CAPABILITIES OF WIRELESS ACCESS ACCESS NODES

(71) Applicant: Ixia, Calabasas, CA (US)

(72) Inventors: Rahul Iyer, Morrisville, NC (US); Madhu H. Rangappagowda, Cary, NC (US)

(73) Assignee: IXIA, Calabasas, CA (US)

( * ) Notice: Subject to any disclaimer, the term of this patent is extended or adjusted under 35 U.S.C. 154(b) by 0 days.

(21) Appl. No.: 14/229,789

(22) Filed: Mar. 28, 2014

(65) Prior Publication Data

US 2014/0321303 A1  Oct. 30, 2014

Related U.S. Application Data

(60) Provisional application No. 61/816,600, filed on Apr. 26, 2013.

(51) Int. Cl.
   *H04L 12/26* (2006.01)
   *H04L 29/06* (2006.01)
   *H04W 24/06* (2009.01)

(52) U.S. Cl.
   CPC .......... *H04L 43/50* (2013.01); *H04L 63/1466* (2013.01); *H04W 24/06* (2013.01)

(58) Field of Classification Search
   CPC . H04L 43/50; H04L 12/2697; H04L 63/1466; H04W 24/00–24/10
   See application file for complete search history.

(56) References Cited

U.S. PATENT DOCUMENTS 5,530,917 A    6/1996   Andersson et al.
5,539,749 A    7/1996   Eul
(Continued)

FOREIGN PATENT DOCUMENTS

JP        2009-065488 A     3/2009
SE     WO 2012150894 A1 * 11/2012 ............ H04W 24/10
(Continued)

OTHER PUBLICATIONS

Commonly-assigned, co-pending International Application No. PCT/US2014/038462 for "Methods, Systems, and Computer Readable Media for Frequency Selective Channel Modeling," (Unpublished, filed May 16, 2014).
(Continued)

*Primary Examiner* — Jackie Zuniga Abad
(74) *Attorney, Agent, or Firm* — Jenkins, Wilson, Taylor & Hunt, P.A.

(57) ABSTRACT

The subject matter described herein relates to methods, systems, and computer readable media for testing inter-cell interference coordination capabilities of wireless access nodes. One method for testing inter-cell interference mitigation capabilities of wireless access nodes includes, in a network equipment test device, emulating at least one user equipment (UE) served by a wireless access node under test. The method further includes emulating a wireless access node. The method further includes causing the emulated wireless access node to generate and send an indication of inter-cell interference to the wireless access node under test. The method further includes monitoring the response and evaluating the performance of the wireless access node under test to the indication of inter-cell interference using the network equipment test device.

23 Claims, 6 Drawing Sheets

(56) References Cited

U.S. PATENT DOCUMENTS

| | | | |
|---|---|---|---|
| 5,561,841 | A | 10/1996 | Markus |
| 5,596,570 | A | 1/1997 | Soliman |
| 5,867,791 | A | 2/1999 | Chambert |
| 6,018,521 | A | 1/2000 | Timbs et al. |
| 6,163,547 | A | 12/2000 | De Vriendt et al. |
| 6,292,667 | B1 | 9/2001 | Wallentin et al. |
| 6,308,065 | B1 | 10/2001 | Molinari et al. |
| 6,374,112 | B1 | 4/2002 | Widegren et al. |
| 6,445,683 | B1 | 9/2002 | Nobuyasu et al. |
| 6,456,675 | B2 | 9/2002 | Wagner et al. |
| 6,466,556 | B1 | 10/2002 | Boudreaux |
| 6,490,315 | B2 | 12/2002 | Katz et al. |
| 6,519,461 | B1 | 2/2003 | Andersson et al. |
| 6,587,457 | B1 | 7/2003 | Mikkonen |
| 6,594,240 | B1 | 7/2003 | Chuah et al. |
| 6,594,241 | B1 | 7/2003 | Malmlöf |
| 6,771,957 | B2 | 8/2004 | Chitrapu |
| 7,558,565 | B2 | 7/2009 | Miller et al. |
| 7,889,663 | B1 | 2/2011 | Wright et al. |
| 8,781,797 | B1 | 7/2014 | Oltman et al. |
| 8,793,117 | B1 | 7/2014 | Varshney et al. |
| 9,125,068 | B2 | 9/2015 | Balkwill |
| 9,351,186 | B2 | 5/2016 | Devarasetty et al. |
| 2002/0012380 | A1 | 1/2002 | Hottinen et al. |
| 2002/0021698 | A1 | 2/2002 | Lee et al. |
| 2002/0183053 | A1 | 12/2002 | Gopalakrishna et al. |
| 2004/0214564 | A1 | 10/2004 | Rosen et al. |
| 2006/0229018 | A1 | 10/2006 | Mlinarsky et al. |
| 2006/0234636 | A1 | 10/2006 | Miller et al. |
| 2006/0262880 | A1 | 11/2006 | Mizuta et al. |
| 2006/0276195 | A1 | 12/2006 | Nordling |
| 2009/0046569 | A1 | 2/2009 | Chen et al. |
| 2009/0109926 | A1 | 4/2009 | Meylan |
| 2010/0075678 | A1 | 3/2010 | Akman et al. |
| 2011/0199985 | A1 | 8/2011 | Cai et al. |
| 2011/0223900 | A1 | 9/2011 | Yu et al. |
| 2011/0287721 | A1 | 11/2011 | Haran |
| 2011/0294497 | A1 | 12/2011 | Hedlund et al. |
| 2011/0310745 | A1* | 12/2011 | Goria .................. H04W 24/06 370/241 |
| 2012/0150521 | A1 | 6/2012 | Balkwill |
| 2012/0269143 | A1 | 10/2012 | Bertrand et al. |
| 2012/0309323 | A1 | 12/2012 | Guo et al. |
| 2013/0040683 | A1* | 2/2013 | Siomina ............ H04W 28/0236 455/517 |
| 2013/0044610 | A1 | 2/2013 | Zhao et al. |
| 2013/0155872 | A1 | 6/2013 | Subramanian et al. |
| 2013/0155878 | A1 | 6/2013 | Deng et al. |
| 2013/0235727 | A1 | 9/2013 | Campbell et al. |
| 2014/0341052 | A1 | 11/2014 | Devarasetty et al. |

FOREIGN PATENT DOCUMENTS

| | | | |
|---|---|---|---|
| WO | WO 02/098151 | A1 | 12/2002 |
| WO | WO 2012/117147 | A1 | 9/2012 |
| WO | WO 2014/186747 | A1 | 11/2014 |

OTHER PUBLICATIONS

Commonly-assigned, co-pending U.S. Appl. No. 14/280,319 for "Methods, Systems, and Computer Readable Media for Frequency Selective Channel Modeling," (Unpublished, filed May 16, 2014).

Overview of 3GPP Release 10 V0.2.0 (Mar. 2014).

"LTE and LTE-A Products," Part No. 46891/580, Issue 3, pp. 1-16 (Jan. 2013).

"Infrastructure Test System, TM500 LTE-A, 3GPP LTE Test," Part No. 46900/003, Issue 1, pp. 1-8 (Oct. 2012).

"Aeroflex Launches TM500 LTE-A Test Mobile," http://www.evaluationengineering.com/news/aeroflex-launches-tm500-lte-a-test-mobile.php, p. 1 (Jul. 19, 2012).

Notice of Allowance and Fee(s) Due for U.S. Appl. No. 13/154,166 (Apr. 13, 2015).

Non-Final Office Action for U.S. Appl. No. 13/154,166 (Oct. 28, 2014).

Notification of Transmittal of the International Search Report and the Written Opinion of the International Searching Authority for International Application No. PCT/US2014/038462 (Sep. 24, 2014).

Notification of Transmittal of the International Search Report and the Written Opinion of the International Searching Authority, or the Declaration for International Application No. PCT/US2014/035204 (Aug. 22, 2014).

Notice of Allowance and Fee(s) Due for U.S. Appl. No. 13/154,166 (Jun. 2, 2014).

Applicant-Initiated Interview Summary for U.S. Appl. No. 13/154,166 (Apr. 28, 2014).

Final Office Action for U.S. Appl. No. 13/154,166 (Mar. 3, 2014).

Non-Final Office Action for U.S. Appl. No. 13/154,166 (Aug. 19, 2013).

Dahlman et al., "10.4.9: Blind Decoding of PDCCHs," 4G LTE / LTE-Advanced for Mobile Broadband, pp. 199-202 (2011).

Ikuno et al., "System level simulation of LTE networks," 2010 IEEE 71st Vehicular Technology Conference: VTC2010-Spring, (May 16-19, 2010).

"IxCatapult Chassis," http://www.ixiacom.com/products/display?skey=ch_ixcatapult, pp. 1-2 (Downloaded from the Internet Apr. 14, 2010).

"Wireless Network Testing," Ixia, 915-2623-01 Rev A, pp. 1-18 (Jan. 2010).

"Wireless Network Testing," Ixia, 915-2622-01 Rev A, pp. 1-16 (Jan. 2010).

Xiao et al., "IMS Network Deployment Cost Optimization Based on Flow-Based Traffic Model," IEEE/IFIP Network Operations and Management Symposium—NOMS 2010, pp. 232-239 (2010).

"DCT2000 LTE UE Simulation API Manual," Release 17.1, Catapult Communications, pp. 1-106 (May 2009).

"Catapult Communications Announces High-Capacity LTE UE Simulation Test System," Catapult Communications Corporation, pp. 1-2 (Feb. 9, 2009).

"Network Topology," http://web.archive.org/web/20081219235147/http://en.wikipedia.org/wiki/Network_topology, pp. 1-9 (Dec. 19, 2008).

"LTE (Long Term Evolution) Testing Systems," http://www.catapult.com/technologies/tech_lte.htm, pp. 1-2 (Jun. 26, 2008).

Non-Final Office Action for U.S. Appl. No. 09/866,955 (Dec. 31, 2013).

Notification of Transmittal of the International Search Report or the Declaration for International Application No. PCT/US02/16638 (Oct. 29, 2002).

"Universal Mobile Telecommunications (UMTS) Protocols and Protocol Testing," International Engineering Consortium, http://www.iec.org/online/tutorials/UMTS/topic04.html, pp. 1-3 (2001).

"Universal Mobile Telecommunications System (UMTS) Protocols and Protocol Testing," International Engineering Consortium, http://www.iec.org/online/tutorials/UMTS/topic02.html, pp. 1-7 (2001).

"Universal Mobile Telecommunications System (UMTS); UTRAN Iub Interface User Plane Protocols for Common Transport Channel Data Streams (3GPP TS 25.435 version 3.5.0 Release 1999)," ETSI TS 125 435 V3.5.0 (Dec. 2000).

"Universal Mobile Telecommunications System (UMTS); UTRAN Iub Interface Data Transport and Transport Signalling for Common Transport Channel Data Streams (3GPP TS 25.434 version 3.4.0 Release 1999)," ETSI 125 434 V3.4.0 . (Dec. 2000).

"Universal Mobile Telecommunications System (UMTS); UTRAN Iub Interface NBAP Signalling (3GPP TS 25.433 version 3.4.1 Release 1999)," ETSI TS 125 433 V3.4.1 (Dec. 2000).

"Universal Mobile Telecommunications System (UMTS); UTRAN Iub/Iur Interface User Plane Protocol for DCH Data Streams (3GPP TS 25.427 version 3.5.0 Release 1999)," ETSI TS 125 427 V3.5.0 (Dec. 2000).

"Universal Mobile Telecommunications System (UMTS); UTRAN Iur and Iub Interface Data Transport; Transport Signalling for DCH Data Streams (3GPP TS 25.426 version 3.5.0 Release 1999)," ETSI TS 125 426 V3.5.0 (Dec. 2000).

(56) References Cited

OTHER PUBLICATIONS

"Universal Mobile Telecommunications System(UMTS); UTRAN Overall Description (3GPP TS 25.401 version 3.5.0 Release 1999)," ETSI TS 125 401 V3.5.0 (Dec. 2000).
"Universal Mobile Telecommunications System (UMTS); RRC Protocol Specification (3GPP TS 25.331 version 3.5.0 Release 1999)," ETSI TS 125 331 V3.5.0 (Dec. 2000).
"Universal Mobile Telecommunications System (UMTS); RLC protocol specification (3GPP TS 25.322 version 3.5.0 Release 1999)," ETSI TS 125 322 V3.5.0 (Dec. 2000.)
"Universal Mobile Telecommunications System (UMTS); MAC protocol specification (3GPP TS 25.321 version 3.5.0 Release 1999)," ETSI TS 125 321 V3.6.0 (Dec. 2000).
Kwon et al., "Performance Comparison of RAN-CN Protocol Stacks in IMT-2000 Networks," IEEE, pp. 2370-2374 (2000).
Weiss, "Designing Macroscopic Diversity Cellular Systems," IEEE, pp. 2054-2058 (1999).
Lee et al., "Effect of Soft and Softer Handoffs on CDMA System Capacity," IEEE Transactions on Vehicular Technology, vol. 47, No. 3, pp. 830-841 (Aug. 1998).
Marchent et al., "Handover and Macro Diversity for 3rd Generation Mobile Systems within ATM Fixed Networks," IEEE, pp. 1151-1155 (1996).
Notice of Allowance and Fee(s) Due for U.S. Appl. No. 14/280,319 (Jan. 13, 2016).
Non-Final Office Action for U.S. Appl. No. 14/280,319 (Sep. 15, 2015).
Supplemental Notice of Allowability for U.S. Appl. No. 13/154,166 (Jul. 28, 2015).
Corrected Notice of Allowability for U.S. Appl. No. 13/154,166 (Apr. 24, 2015).
Communication of European publication No. and information on the application of Article 67(3) EPC for European Application No. 14797124.6 (Feb. 24, 2016).
Communication of European publication No. and information on the application of Article 67(3) EPC for European Application No. 14787952.2 (Feb. 3, 2016).

* cited by examiner

METHODS, SYSTEMS, AND COMPUTER READABLE MEDIA FOR TESTING INTER-CELL INTERFERENCE COORDINATION CAPABILITIES OF WIRELESS ACCESS ACCESS NODES

PRIORITY CLAIM

This application claims the benefit of U.S. Provisional Patent Application Ser. No. 61/816,600, filed Apr. 26, 2013; the disclosure of which is incorporated herein by reference in its entirety.

TECHNICAL FIELD

The subject matter described herein relates to testing communications network equipment. More particularly, the subject matter described herein relates to methods, systems, and computer readable media for testing inter-cell interference coordination capabilities of wireless access nodes.

BACKGROUND

In wireless communications networks, wireless access regions are divided into geographic areas served by the same wireless access node.

These regions are referred to as cells. In many cases, especially with the advent of different sizes of cells, the radio coverage areas served by different wireless access nodes overlap. For example, a macrocell may share the same radio coverage area with micro, pico, and femto cells. This overlap is illustrated in FIG. 1. In FIG. 1, the radio coverage areas of macrocell 100, microcell 102, picocell 104, and femtocell 106 overlap.

One problem with cells with overlapping radio coverage areas is inter-cell interference. Inter-cell interference occurs when communications between user equipment and a wireless access node in one cell interferes with communications between user equipment and/or wireless access node in another cell. Such interference may occur when user equipment and/or wireless access nodes in overlapping cells use the same frequency and timeslot for transmission.

In light of the increased possibility of inter-cell interference, procedures have been proposed for mitigating inter-cell interference. For example, the Third Generation Partnership Project (3GPP) has developed procedures referred to as inter-cell interference coordination (ICIC) and enhanced inter-cell interference coordination (eICIC) for wireless access nodes to communicate with each other to reduce inter-cell interference. Before such procedures can be implemented in live networks, it is desirable to test the implementation of these techniques by wireless access network nodes.

Systems that simulate various interference scenarios and test the response a wireless access node are needed. Rather than passively monitoring eICIC and ICIC functionality, it is desirable to trigger eICIC and ICIC functionality and monitor responses of wireless access nodes.

Accordingly, there exists a need for methods, systems, and computer readable media for testing inter-cell interference coordination capabilities of wireless access nodes.

SUMMARY

The subject matter described herein relates to methods, systems, and computer readable media for testing inter-cell interference coordination capabilities of wireless access nodes. One method for testing inter-cell interference coordination capabilities of wireless access nodes includes, in a network equipment test device, emulating at least one user equipment (UE) served by a wireless access node under test. The method further includes emulating a wireless access node. The method further includes triggering the emulated wireless access node to indicate inter-cell interference to the wireless access node under test. The method further includes monitoring the response & evaluating the performance of the wireless access node under test (to the indication of inter-cell interference coordination) using the emulated UE, which is also part of the network equipment test device.

As used herein, the term "wireless access node" is intended to refer to any node through which a mobile device wirelessly accesses a network. Examples of wireless access nodes include base stations, node Bs, e-Node Bs, and wireless access points.

The subject matter described herein for testing inter-cell interference coordination capabilities of wireless network equipment may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

Figure 1:
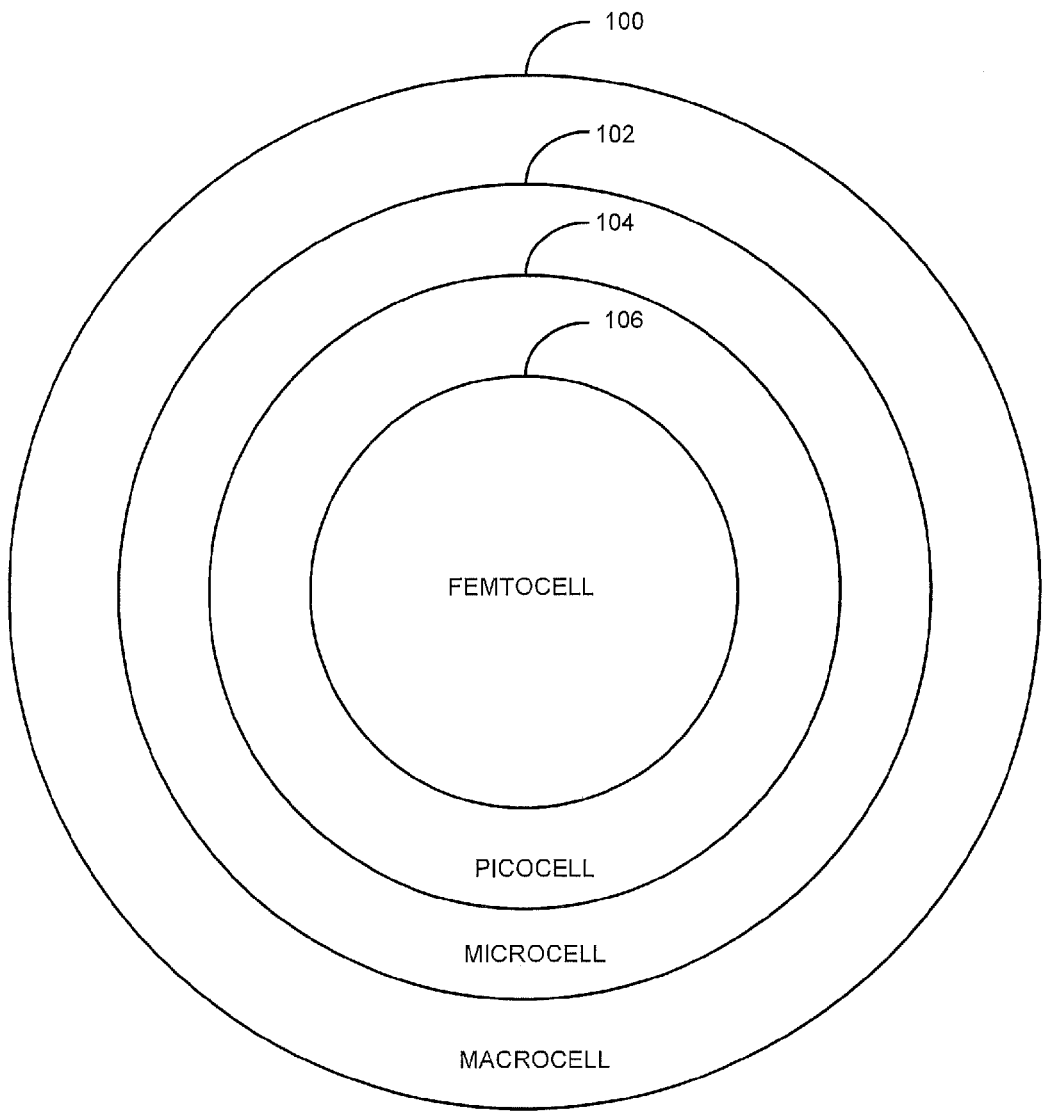
FIG. 1 is a diagram illustrating overlapping cells in a wireless communications network.
Figure 2:
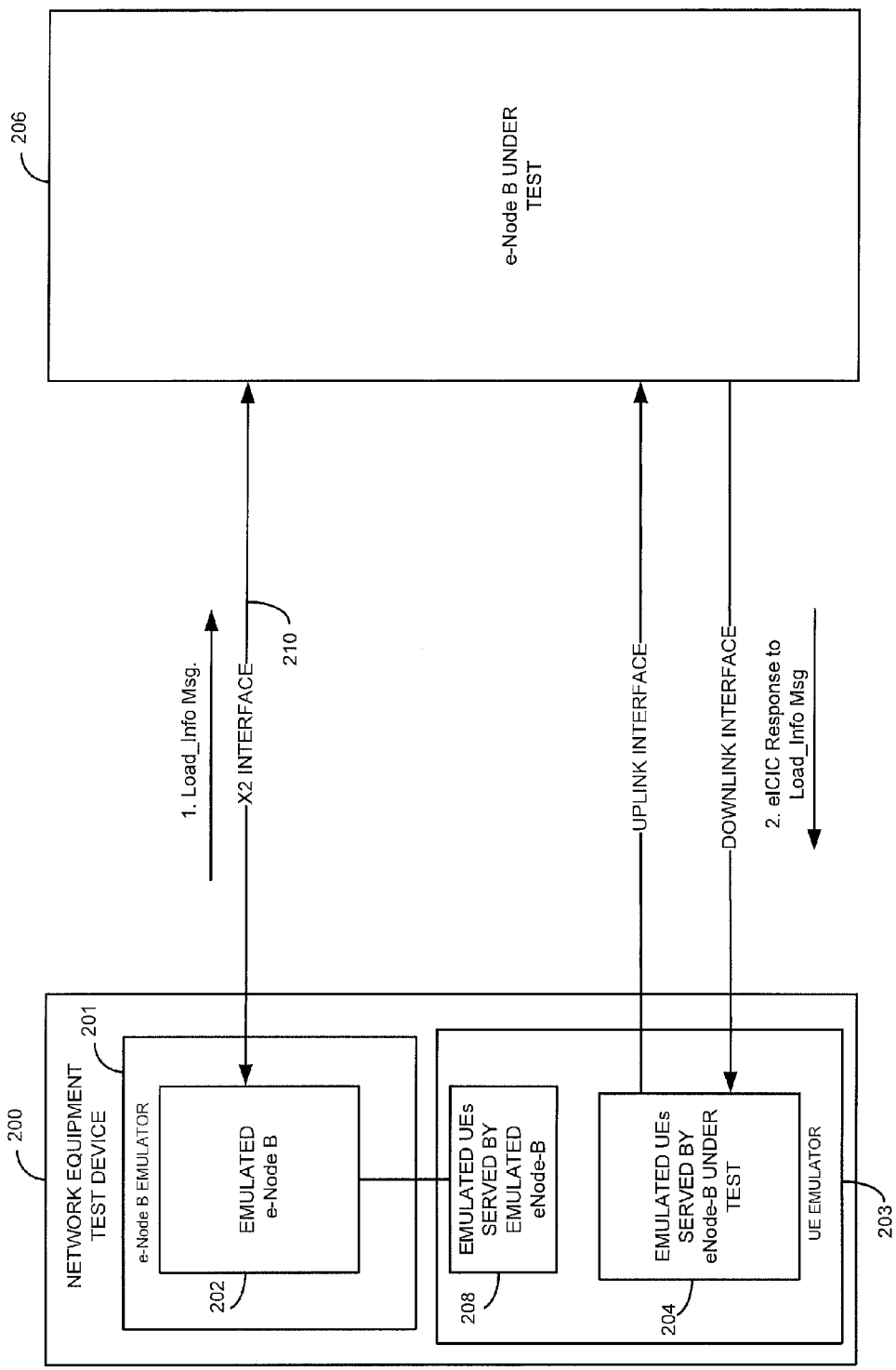
FIG. 2 is a block diagram illustrating a system for testing inter-cell interference coordination capabilities of wireless access nodes according to an embodiment of the subject matter described herein.

The subject matter described herein includes methods, systems, and computer readable media for testing the inter-cell interference coordination capabilities of wireless access nodes. FIG. 2 is a block diagram illustrating a system for testing inter-cell interference coordination capabilities of wireless access nodes according to an embodiment of the subject matter described herein. Referring to FIG. 2, a network equipment test device 200 may include an e-node B emulator 201 configured to emulate a wireless access network node, such as an e-Node B 202 and a UE emulator 203 configured to emulate a plurality of UEs 204 attached to a wireless access node under test, such as e-Node B 206. UE emulator 203 may also emulate UEs 208 attached to emulated e-Node B 202.

In the illustrated example, emulated e-Node B 202 is configured to communicate to e-Node B under test 206 an indication of inter-cell interference coordination. In one example, the indication may be a message transmitted on X2 interface 210. The message may be a load information message that carries information about inter-cell interference or inter-cell interference coordination. The load information message may carry information that informs e-Node B under test 206 of uplink interference experienced by emulated e-Node B 202. The load information message may also or alternatively provide information to e-Node B under test 206 that should cause e-Node B under test 206 to avoid transmitting in certain resource blocks or transmit at lower power levels to avoid interference. For example, one load information message parameter informs e-Node B under test 206 that emulated e-Node B 202 may schedule certain resource blocks for transmissions. In response to such a parameter, e-Node B under test 206 could avoid those resource blocks.

In another example, the load information message may provide information to e-Node B under test 206 that indicates power levels that will be used by emulated e-Node B 202 in certain resource blocks. In response to such a message, e-Node B under test 206 should decrease its transmit power in the indicated resource blocks to avoid inter-cell interference.

In yet another example, the load information message informs e-node B under test 206 of sub-frames that will not be used by emulated e-Node B 202. In response to such information, e-Node B under test 206 may begin utilizing the unused resource blocks even with high power as there will be very little impact on interference.

Network equipment test device 200 may further be configured to monitor the response of e-Node B under test 206 to the indication of inter-cell interference coordination received from emulated e-Node B 202. In one example, network equipment test device 200 may monitor downlink transmissions of e-Node B under test 206 to determine whether resource blocks are used, unused, used at reduced power levels, or used at non-reduced power levels in response to the indication of inter-cell interference coordination. If the load information message should cause e-Node B under test 206 to avoid transmissions in certain downlink resource blocks, network equipment test device 200 may monitor the downlink resource blocks to confirm that e-Node B under test 206 is in fact avoiding the indicated downlink resource blocks. If the load information message should cause e-Node B under test 206 to avoid transmissions above certain power levels in certain downlink resource blocks, network equipment test device 200 may monitor the downlink resource blocks to confirm that e-Node B under test 206 is in fact transmitting at the appropriate power levels the indicated downlink resource blocks. If the load information message informs e-Node B under test 206 that certain resource blocks will not be used by emulated e-Node B 202, network equipment test device 200 may monitor the resource blocks to determine whether e-Node B under test 206 begins to use the unused resource blocks in response to the load information message.

Figure 3:
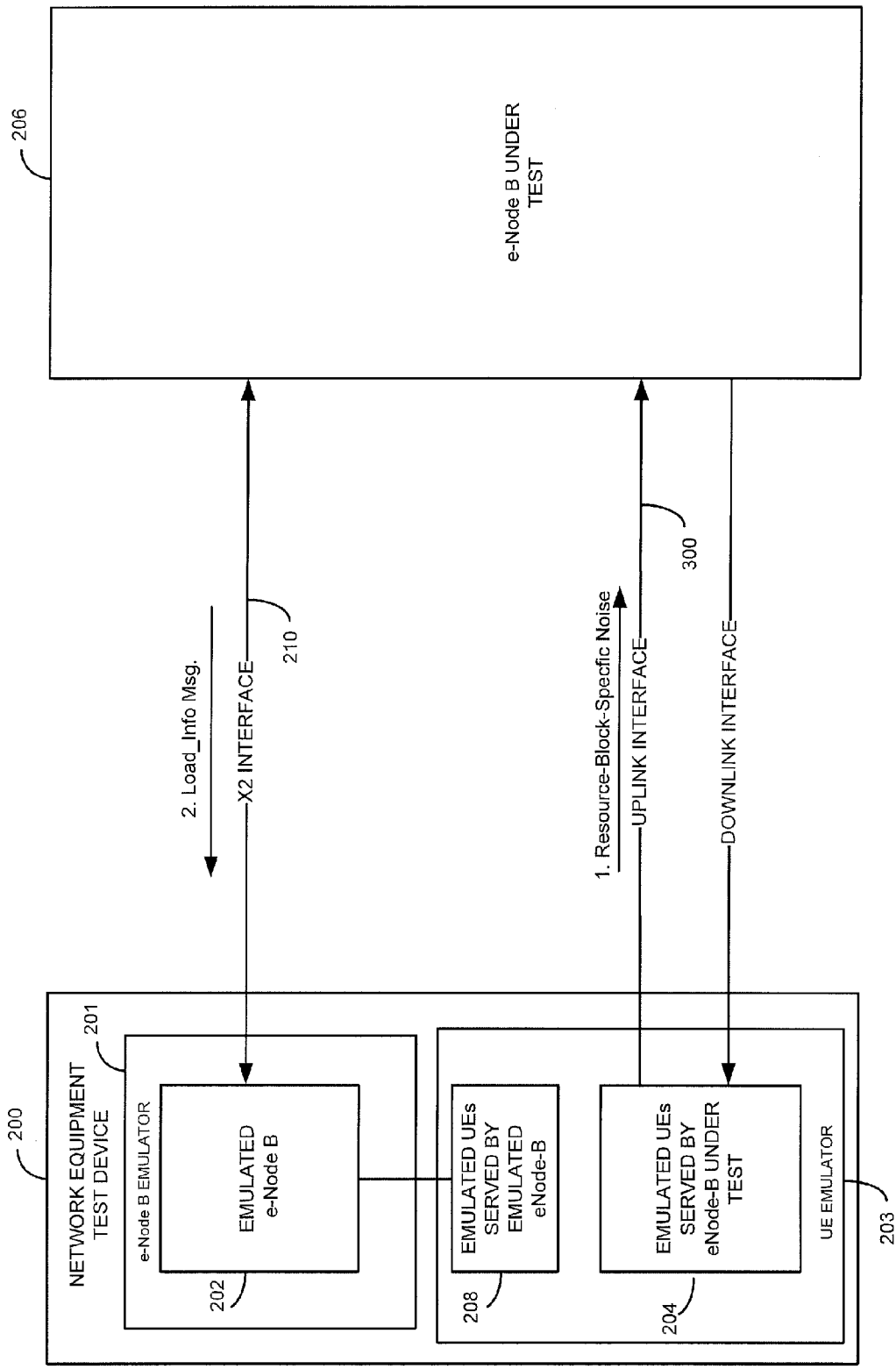
FIG. 3 is a block diagram of the system illustrated in FIG. 2 for testing additional inter-cell interference coordination capabilities of wireless access nodes according to an embodiment of the subject matter described herein.

In the example illustrated in FIG. 2, network equipment test device 200 sends a message to e-Node B under test 206 on the X2 interface and monitors the response over the wireless interface between emulated UEs and eNodeB under test. In an alternate example, network equipment test device 200 may simulate interference on the wireless interface and monitor the response of e-Node B under test 206 on the X2 interface. Simulating inter-cell interference on the wireless interface may include generating frequency-specific noise, i.e., noise in specific resource blocks, which will appear to e-Node B under test 206 as inter-cell interference. FIG. 3 illustrates such an example. In FIG. 3, emulated UEs 204 attached to e-Node B under test 206 generate signals indicative of inter-cell interface on uplink interface 300, and emulated e-Node B 202 monitors the response of e-Node B under test 206 on X2 interface 210. In one example, when emulated UEs 204 generate signals indicative of inter-cell interference in certain resource blocks, emulated e-Node B 202 may monitor X2 interface 210 for a load information message informing emulated e-Node B 202 of the inter-cell interference and/or instructing emulated e-Node B 202 to avoid or reduce power in such resource blocks.

Figure 4:
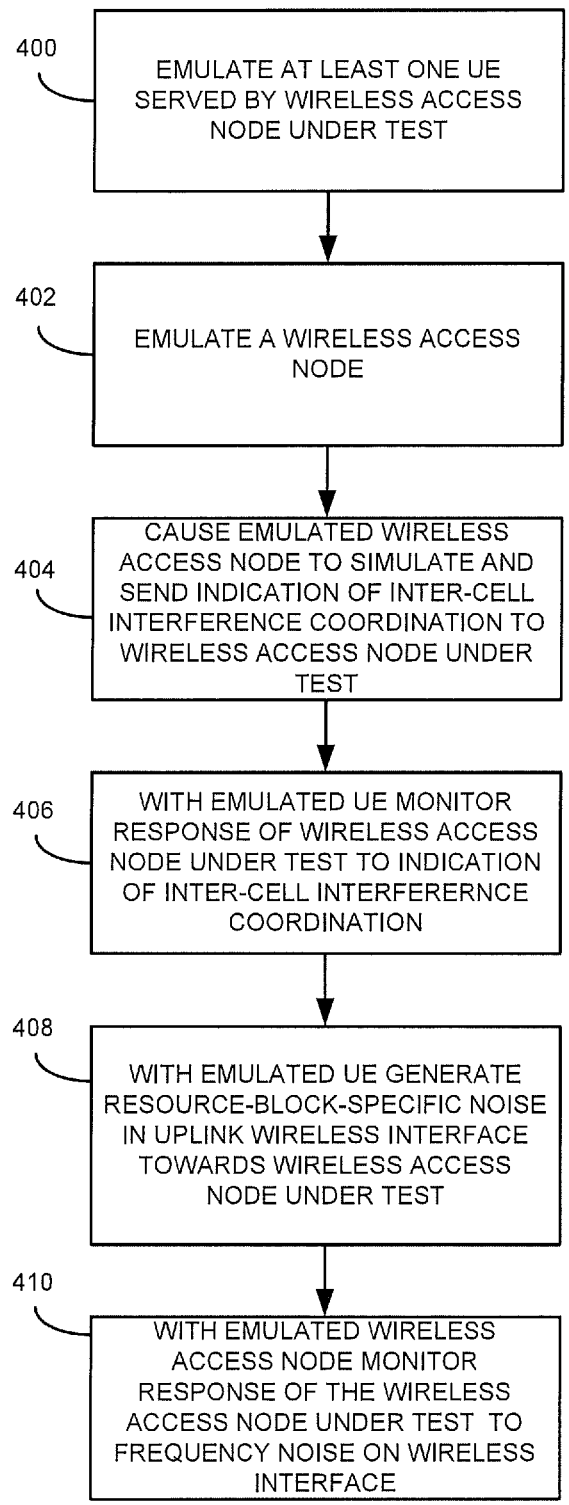
FIG. 4 is a flow chart illustrating exemplary overall steps for testing inter-cell interference coordination capabilities of wireless access nodes according to an embodiment of the subject matter described herein.

FIG. 4 is a flow chart illustrating exemplary overall steps for testing inter-cell interference coordination capabilities of a wireless network access node according to an embodiment of the subject matter described herein. Referring to FIG. 4, in step 400, at least one UE served by a wireless access node under test is emulated, preferably more. For example, network equipment test device 200 may emulate UEs 204 served by e-Node B under test 206. Emulating UEs may include attaching to e-Node B under test 206, requesting for resources to be scheduled, transmitting data on the uplink channel to e-Node B under test 206 and receiving and processing data on the downlink channel received from e-Node B under test 206.

In step 402, a wireless access node is emulated. For example, network equipment test device 200 may emulate a second e-Node B 202. Emulating the second e-Node B 202 may include establishing an X2 interface 210 with e-Node B under test 202 and communicating with e-Node B under test 206 over the X2 interface 210. Network equipment test device 200 may also emulate UEs 208 served by emulated e-Node B 202.

In step 404, the emulated wireless access node is triggered to simulate inter-cell interference to the wireless access node under test. For example, network equipment test device 200 may cause emulated e-Node B 202 to send an X2 load information message to e-Node B under test 206 over X2 interface 210. The load information message may inform e-Node B under test 206 of inter-cell interference and/or instruct e-Node B under test 206 of resource blocks that are best avoided, resource blocks that can be used at predetermined power levels, or resource blocks that will not be used at all by UEs 208 served by emulated e-Node B 202.

In step 406 the response of the wireless access node under test to the indication of inter-cell interference coordination is monitored. For example, emulated UEs 204 may monitor the downlink channel with e-Node B under test 206 to determine whether resource elements are appropriately utilized by e-Node B under test 206 in response to the indication of inter-cell interference coordination.

In steps 408 and 410, frequency specific noise is generated on the UL wireless interface and the response of e-Node B under test 206 is monitored on the X2 interface 210. For example, emulated UEs 204 may generate noise in specific resource blocks of uplink channel 300 with e-Node B under test 206. The noise may be generated to appear as inter-cell interference. For example, noise may be generated by UEs 204 that appears to e-Node B under test 206 to be coming from a neighboring cell (in this case, from emulated e-node B 202. Emulated e-Node B 202 may then monitor the response of e-Node B under test 206 on X2 interface 210. Emulated e-Node B 202 may analyze the response to determine whether it contains appropriate information for avoiding inter-cell interference. Continuing with the example of noise in certain uplink resource blocks used by e-Node B under test 206 for its UEs 204, emulated e-Node B 202 may analyze the load information message coming from eNodeB under test to determine whether it contains parameters indicating inter-cell interference in the affected resource blocks.

Figure 5:
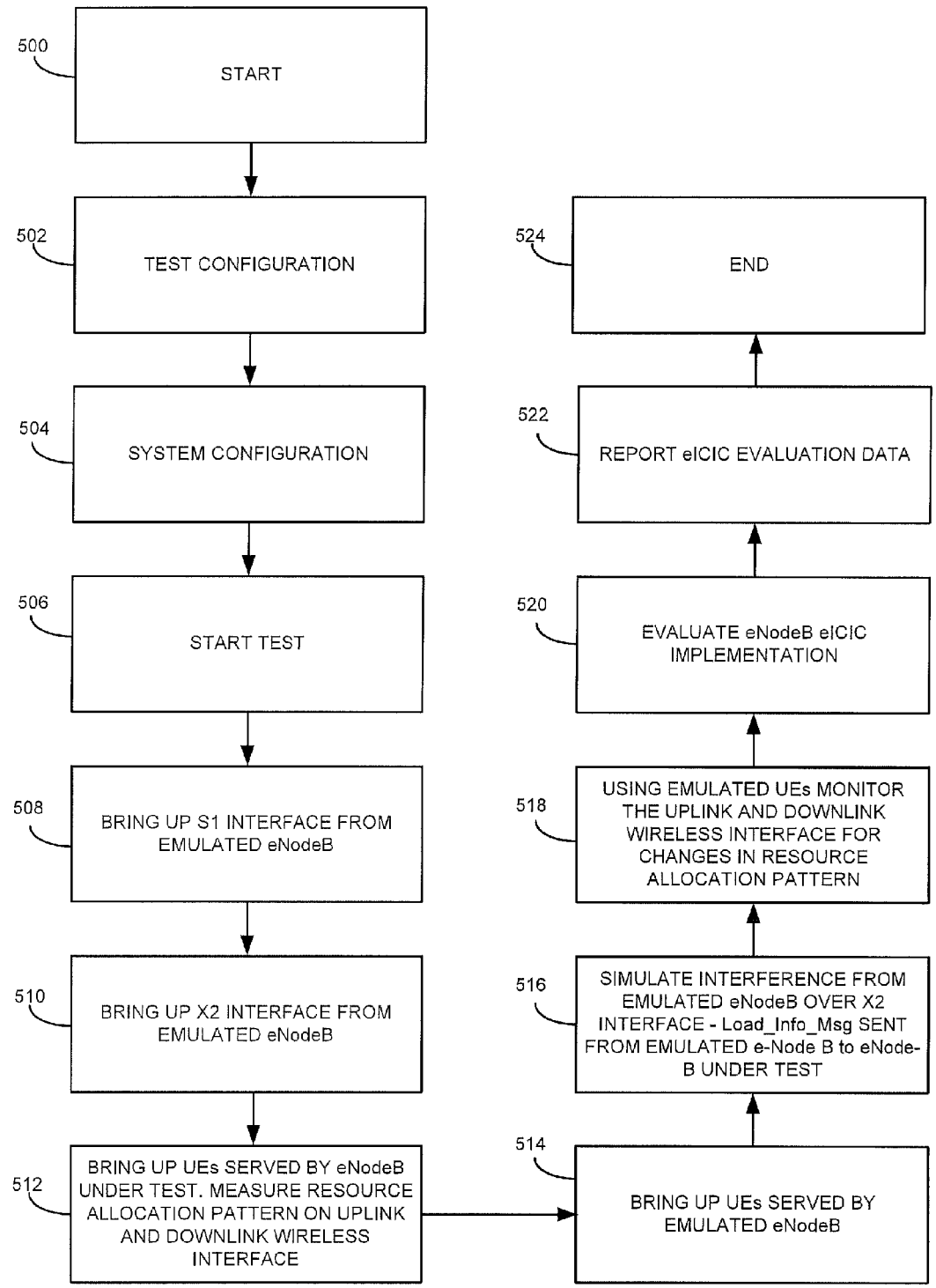
FIG. 5 is a flow chart illustrating exemplary detailed steps for testing inter-cell interference coordination capabilities of wireless access nodes in response to a message on the X2 interface according to an embodiment of the subject matter described herein.

FIG. 5 is a flow chart illustrating in more detail operations performed by network equipment test system 200 in steps 400 through 406 in FIG. 4 where the emulated e-Node B 202 sends an X2 load information to the e-Node B under test 206 and monitors the response. Referring to FIG. 5, in step 500, the test process begins. In step 502, the test is configured by inputting, into network equipment test device 200, uplink and downlink interference parameters. In step 504, system configuration is performed where the emulated e-Node B 202 and UE information is input into test device 200. In step 506, the test is started. In step 508 the S1 interface between the emulated e-Node B 202 and the MME (part of Evolved Packet Core network) is established. In step 510, the X2 interface 210 between the emulated e-Node B 202 and the e-Node B under test 206 is established. In step 512, the UEs served by the eNodeB under test are first brought into service. The simulated UEs attach to the network and start utilizing all the resource blocks by simulating full throughput. During this phase, the network equipment test system 200 monitors the RF link and analyses the Resource Block allocation pattern. In step 514, the UEs served by the emulated e-Node B under test 206 are brought into service.

In step 516, the emulated e-Node B 202 sends an X2 load information message to the e-Node B under test 206 and simulates inter-cell interference. The load information message may include the following parameters:

High interference indicator (HII)—proactive measure—informs neighboring e-Node B of resource blocks that the sending e-Node B is likely to schedule for transmissions Uplink interference overload indication: reactive measure—indicates one of three levels (low, medium, high) of uplink interference experienced in its resource blocks Uplink high interference indication: UL proactive measure (avoidance)

Relative narrowband transmit power (RNTP): downlink proactive measure—informs neighboring e-Node B, for each resource block, whether power level will exceed a predetermined threshold Almost blank sub-frame (ABS): downlink proactive measure.

In step 518, the UEs served by the eNodeB device under test that are emulated by network equipment test device 200 monitor changes in Resource Block allocation pattern. In step 520, network equipment test device 200 evaluates the inter-cell interference avoidance capabilities of the e-Node B under test 206. The eICIC implementation by e-Node B under test 206 may be evaluated by extracting downlink and uplink DCIs and comparing parameters in the Das relating to resource block allocation against pre-interference simulation scenario. The DCIs may indicate resource blocks that are used on the uplink and downlink channels. The resource block allocation pattern may be compared with pre-interference simulation scenario and evaluated based on ICIC or eICIC parameters specified in the load information message to determine whether and how the ICIC or eICIC procedures are implemented by e-Node B under test 206. Specific evaluation criteria to evaluate the e-Node B under test include:

Latency for eICIC procedures—Network equipment test device 200 may determine and report a time delay between sending of the load information message communicating inter-cell interference coordination to e-Node B under test 206 and noticing a change in Resource Block allocation pattern.

UL RB Compensation factor:—Network equipment test device 200 may decode uplink DCIs received from e-Node B under test to determine the compensation factor applied by scheduler in response to inter-cell interference coordination parameters in the load information message.

DL RB Compensation factor: Network equipment test device 200 may decode the downlink DCIs received from e-Node B under test 206 to determine whether downlink resource block allocations are responsive to the inter-cell interference coordination parameters in the load information message.

In step 522, network equipment test device 200 generates a report of the eICIC evaluation data. The report may include any of the evaluation criteria discussed with respect to step 520. In step 524, the process ends.

Figure 6:
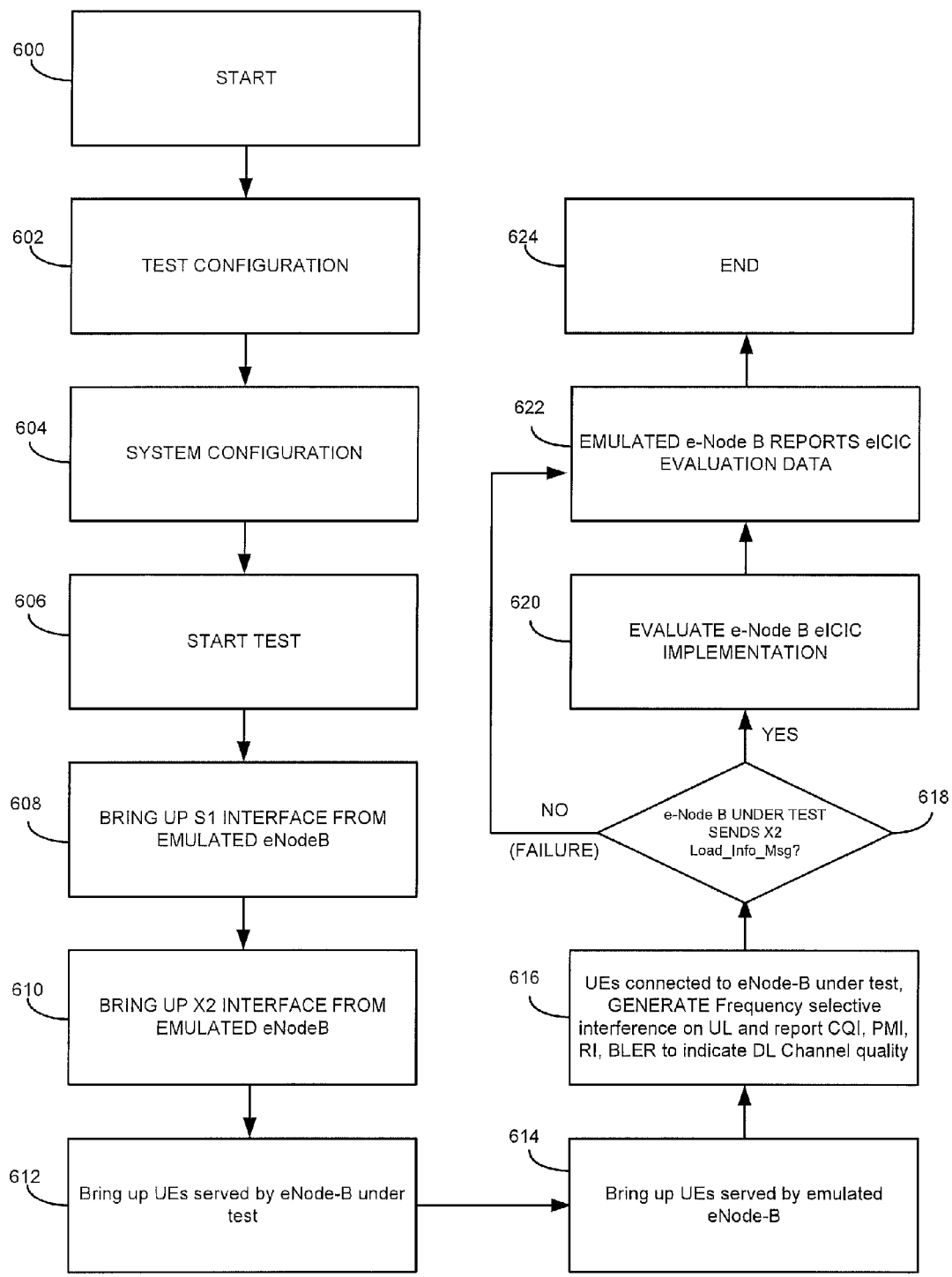
FIG. 6 is a flow chart illustrating exemplary detailed steps for testing inter-cell interference coordination capabilities of wireless access nodes in response to resource-block-specific noise generated on the wireless interface according to an embodiment of the subject matter described herein.

FIG. 6 is a flow chart illustrating the testing of the X2 interface 210 in response to interference generated on the wireless interface, as indicated by steps 408 and 410 and FIG. 4. Referring to FIG. 6, in step 600, the test begins. In step 602, test is configured to simulate UL interference from emulated UE. In step 604, emulated e-Node B 202 and UE information is input into network equipment test device 200. In step 606, the test begins. In step 608, the S1 interface is brought into service. In step 610, the X2 interface is brought into service. In step 612, the UEs served by the e-Node B under test are brought into service. In step 614, the UEs served by emulated e-Node B are brought into service.

In step 616, frequency-specific interference is generated on the uplink channel. The frequency-specific interference may be generated by the emulated UEs that are served by the e-Node B under test 206. The UEs may simulate frequency-specific interference and noise on the uplink and report poor channel state indicators, such as wideband channel quality indicator (WBCQI), sub-band CQI, precoding matrix indicator (PMI), rank indicator (RI), block error rate (BLER), etc., for downlink.

In step 618, e-Node B under test 206 should send an X2 load information message. The load information message may be based on uplink interference and downlink channel quality messages. The e-Node B under test 206 should send the load information message to the neighboring e-Node B to indicate evasive actions, such as uplink interference overload indication, uplink high interference indication, uplink proactive measure (avoidance), RNTP: DL proactive measure, ABS: DL proactive measure. If the load information is sent, control proceeds to step 620 where the emulated e-Node B 202 evaluates the eICIC implementation by checking the parameters in the load information message.

If, on the other hand, the load information message is not sent in step 622, the emulated eNodeB proceeds to generate a final report evaluating the eICIC function of the eNodeB. The report may include the parameters present in the load information message. In step 624 the process ends.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for testing inter-cell interference coordination capabilities of wireless access nodes, the method comprising:
   in a network equipment test device for testing inter-cell interference coordination capabilities of wireless access nodes:
      emulating at least one user equipment (UE) served by a wireless access node under test;
      emulating a wireless access node;
      causing the emulated wireless access node to generate and send an indication of inter-cell interference coordination to the wireless access node under test, wherein the indication comprises a load information message;
      monitoring a response of the wireless access node under test to the indication of inter-cell interference coordination using the network equipment test device for testing inter-cell interference coordination capabilities of the wireless access node under test, wherein monitoring the response includes monitoring downlink transmissions of the wireless access node under test; and
      determining, using the network equipment test device, inter-cell interference coordination performance parameters of the wireless access node under test from the response to the indication of inter-cell interference of the emulated wireless access node.

2. The method of claim 1 wherein emulating at least one UE includes emulating a plurality of UEs.

3. The method of claim 1 wherein emulating a wireless access node includes emulating an evolved node B (e-node B).

4. The method of claim 1 wherein causing the emulated wireless access node to generate an indication of inter-cell interference coordination includes causing the emulated wireless access node to generate the load information message on an X2 interface with the wireless access node under test.

5. The method of claim 4 wherein the load information message informs the wireless access node under test of uplink interference experienced by the emulated wireless access node.

6. The method of claim 4 wherein the load information message provides information to the wireless access node under test that should cause the wireless access node under test to avoid transmitting in certain resource blocks.

7. The method of claim 4 wherein the load information message provides information to the wireless access node under test regarding whether or not a power threshold in certain resource blocks should be exceeded.

8. The method of claim 4 wherein the load information message informs the wireless access node under test of sub-frames that will not be used by the emulated wireless access node.

9. The method of claim 1 wherein monitoring the downlink transmissions of the wireless access node under test includes determining whether the wireless access node under test is refraining from scheduling in certain resource blocks, scheduling in certain resource blocks, or scheduling at certain power levels in certain resource blocks in response to the indication of inter-cell interference coordination.

10. The method of claim 1 comprising generating, using the emulated user equipment, resource-block-specific noise on a wireless link with the wireless access node under test and monitoring, using the emulated wireless access node, a response of the wireless access node under test to the resource-block-specific noise.

11. The method of claim 10 wherein monitoring the response of the wireless access node under test to the resource-block-specific includes monitoring messages generated by the wireless access node under test on an X2 interface in response to the resource-block-specific noise.

12. A system for testing inter-cell interference coordination capabilities of wireless access nodes, the method comprising:
   a network equipment test device for testing inter-cell interference coordination capabilities of wireless access nodes comprising:
      a user equipment (UE) emulator configured to emulate at least one UE served by a wireless access node under test; and
      a wireless access node emulator configured to emulate a wireless access node and to cause the emulated wireless access node to generate and send an indication of inter-cell interference coordination to the wireless access node under test, wherein the indication comprises a load information message;
      wherein the UE emulator is configured to monitor a response of the wireless access node under test to the indication of inter-cell interference coordination, wherein monitoring the response includes monitoring downlink transmissions of the wireless access node under test; and
      wherein inter-cell interference coordination performance parameters of the wireless access node under test are determined by the network equipment test device from the response to the indication of inter-cell interference of the emulated wireless access node.

13. The system of claim 12 wherein the UE emulator is configured to emulate a plurality of UEs.

14. The system of claim 12 wherein the wireless access node emulator is configured to emulate an evolved node B (e-Node B).

15. The system of claim 12 wherein the network equipment test device for testing inter-cell interference coordination capabilities of wireless access nodes is configured to cause the emulated wireless access node to generate the indication of inter-cell interference on an X2 interface with the wireless access node under test.

16. The system of claim 12 wherein the load information message informs the wireless access node under test of uplink interference experienced by the emulated wireless access node.

17. The system of claim 12 wherein the load information message provides information to the wireless access node under test that should cause the wireless access node under test to avoid scheduling certain resource blocks.

18. The system of claim 12 wherein the load information message provides information to the wireless access node under test that should cause the wireless access node under test to avoid transmitting over a power threshold in certain resource blocks.

19. The system of claim 12 wherein the load information message informs the wireless access node under test of sub-frames that will not be used by the emulated wireless access node.

20. The system of claim 12 wherein monitoring the downlink transmissions of the wireless access node under test includes determining whether the wireless access node under test is refraining from scheduling certain resource blocks, or scheduling at certain power levels in certain resource blocks in response to the indication of inter-cell interference coordination.

21. The system of claim 12 wherein the emulated user equipment is configured to generate resource-block-specific noise on an uplink channel with the wireless access node under test and wherein the emulated wireless access node is configured to monitor a response of the wireless access node under test to the resource-block-specific noise.

22. The system of claim 21 wherein monitoring the response of the wireless access node under test includes monitoring messages generated by the wireless access node under test on an X2 interface in response to the resource-block-specific noise.

23. A non-transitory computer readable medium having stored thereon executable instructions that when executed by the processor of a computer control the computer to perform steps comprising:
in a network equipment test device for testing inter-cell interference coordination capabilities of wireless access nodes:
emulating at least one user equipment (UE) served by a wireless access node under test;
emulating a wireless access node;
causing the emulated wireless access node to generate and send an indication of inter-cell interference coordination to the wireless access node under test, wherein the indication comprises a load information message;
monitoring a response of the wireless access node under test to the indication of inter-cell interference coordination using the network equipment test device for testing inter-cell interference coordination capabilities of the wireless access node, wherein monitoring the response includes monitoring downlink transmissions of the wireless access node under test; and
determining, using the network equipment test device, inter-cell interference coordination performance parameters of the wireless access node under test from the response to the indication of inter-cell interference of the emulated wireless access node.

* * * * *